United States Patent
Kern, Jr. et al.

(10) Patent No.: US 9,432,807 B2
(45) Date of Patent: Aug. 30, 2016

(54) SYSTEM AND METHOD WITH AUTOMATIC RADIUS CROSSING NOTIFICATION FOR GLOBAL POSITIONING SYSTEM (GPS) TRACKER

(71) Applicant: Honeywell International Inc., Morristown, NJ (US)

(72) Inventors: James W. Kern, Jr., East Islip, NY (US); Phil Ferro, Setauket, NY (US); Frank Joseph Nisita, Plainview, NY (US); Richard J. Laube, Holtsville, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 124 days.

(21) Appl. No.: 13/900,696

(22) Filed: May 23, 2013

(65) Prior Publication Data

US 2014/0349672 A1    Nov. 27, 2014

(51) Int. Cl.
| | |
|---|---|
| *H04W 24/00* | (2009.01) |
| *H04W 4/02* | (2009.01) |
| *B60R 25/33* | (2013.01) |
| *G08B 21/02* | (2006.01) |
| *B60R 25/10* | (2013.01) |

(52) U.S. Cl.
CPC .......... *H04W 4/021* (2013.01); *B60R 25/1012* (2013.01); *B60R 25/33* (2013.01); *G08B 21/0261* (2013.01); *G08B 21/0269* (2013.01)

(58) Field of Classification Search
CPC ......... G08B 21/0261; G08B 21/0269; H04W 4/021; H04W 24/00; B06R 25/33; B06R 25/1012

USPC .............. 455/456.1–456.3, 457, 404.2, 421
See application file for complete search history.

(56) References Cited

U.S. PATENT DOCUMENTS

| | | | |
|---|---|---|---|
| 8,644,848 B2 * | 2/2014 | Williams | G06Q 30/0261 455/456.1 |
| 8,903,426 B2 * | 12/2014 | Tholkes et al. | 455/456.3 |
| 2002/0101365 A1 | 8/2002 | Flick | |
| 2003/0060938 A1 * | 3/2003 | Duvall | B60R 25/1012 701/2 |
| 2005/0017855 A1 * | 1/2005 | Harvey | B60R 25/1012 340/426.1 |
| 2006/0200305 A1 * | 9/2006 | Sheha et al. | 701/200 |
| 2006/0238379 A1 * | 10/2006 | Kimchi et al. | 340/995.1 |
| 2007/0129082 A1 * | 6/2007 | Thacher | 455/456.1 |
| 2008/0162034 A1 * | 7/2008 | Breen | 701/202 |

(Continued)

FOREIGN PATENT DOCUMENTS

WO    WO 2005/095167 A1    10/2005

OTHER PUBLICATIONS

Internet YouTube video, GeoFence Tutorial, http://www.youtube.com/watch?Vd1t3MwbfU1M&feature=player_detailpage, uploaded Apr. 1, 2011.

(Continued)

*Primary Examiner* — Mong-Thuy Tran
(74) *Attorney, Agent, or Firm* — Husch Blackwell LLP

(57) ABSTRACT

Systems and methods with automatic radius cross notification for a GPS tracker are provided. Some methods can include receiving user input requesting a dynamic creation of a geo-fence, and, responsive thereto, creating the geo-fence. Some methods can include determining when a GPS tracker device has been stationary for a predetermined period of time, and responsive thereto, dynamically creating a geo-fence.

14 Claims, 4 Drawing Sheets

(56) References Cited

U.S. PATENT DOCUMENTS

| | | | |
|---|---|---|---|
| 2008/0242317 A1* | 10/2008 | Abhyanker | 455/456.3 |
| 2009/0140886 A1* | 6/2009 | Bender | B60R 25/00 340/988 |
| 2010/0017126 A1* | 1/2010 | Holcman et al. | 701/300 |
| 2010/0036608 A1* | 2/2010 | Johnson et al. | 701/207 |
| 2010/0042940 A1* | 2/2010 | Monday et al. | 715/764 |
| 2010/0148947 A1* | 6/2010 | Morgan et al. | 340/426.22 |
| 2011/0148634 A1* | 6/2011 | Putz | 340/541 |
| 2012/0259537 A1* | 10/2012 | Schmidt et al. | 701/300 |
| 2012/0309409 A1* | 12/2012 | Grosman et al. | 455/456.1 |
| 2013/0045753 A1* | 2/2013 | Obermeyer et al. | 455/456.1 |
| 2013/0079028 A1* | 3/2013 | Klein | 455/456.1 |
| 2013/0143586 A1* | 6/2013 | Williams et al. | 455/456.1 |
| 2013/0144771 A1* | 6/2013 | Boling et al. | 705/35 |
| 2013/0225196 A1* | 8/2013 | James et al. | 455/456.1 |
| 2013/0310053 A1* | 11/2013 | Srivastava et al. | 455/446 |
| 2013/0331127 A1* | 12/2013 | Sabatelli et al. | 455/456.3 |
| 2014/0057648 A1* | 2/2014 | Lyman et al. | 455/456.1 |
| 2014/0242947 A1* | 8/2014 | Ali et al. | 455/411 |

OTHER PUBLICATIONS

European Search Report and Search Opinion from corresponding EP application 14167276.6, dated Sep. 23, 2014.

* cited by examiner

SYSTEM AND METHOD WITH AUTOMATIC RADIUS CROSSING NOTIFICATION FOR GLOBAL POSITIONING SYSTEM (GPS) TRACKER

FIELD

The present invention relates generally to GPS tracking systems. More particularly, the present invention relates to a system and method with automatic radius cross notification for a GPS tracker device.

BACKGROUND

Known Global Positioning System ("GPS") tracking systems can provide a user with the ability to pre-configure a radius around a location for which events can occur and/or can transmit notification messages when an object crosses the radius. For example, some known GPS tracking systems refer to a pre-configured radius as a geo-fence. In these systems, when an object, such as a tracking device or an object being tracked by a tracking device, crosses the radius in either direction, a notification message, such as an email, an SMS message, an application event, or the like, can be transmitted to a user.

In known systems, a geo-fence can be pre-configured by a user around a defined location, such as the user's home or place of business. Then, a notification message can be transmitted to the user when an object, such as the user's vehicle, exits the geo-fence.

However, known systems permit a limited number of geo-fences and require that the geo-fences be pre-configured. That is, known systems limit the number of locations around which a radius of a geo-fence can be configured and require that those locations and radii be pre-configured. This can be problematic because such systems do not assist a user who wants to track an object around a location that is not necessarily predetermined or frequently visited, for example, a shopping mall, a sales call location, and the like. Without a pre-configured geo-fence, the user's object remains unprotected when at those locations.

In view of the above, there is a continuing, ongoing need for improved systems and methods with automatic radius cross notification for a GPS tracker device.

DETAILED DESCRIPTION

Figure 1:
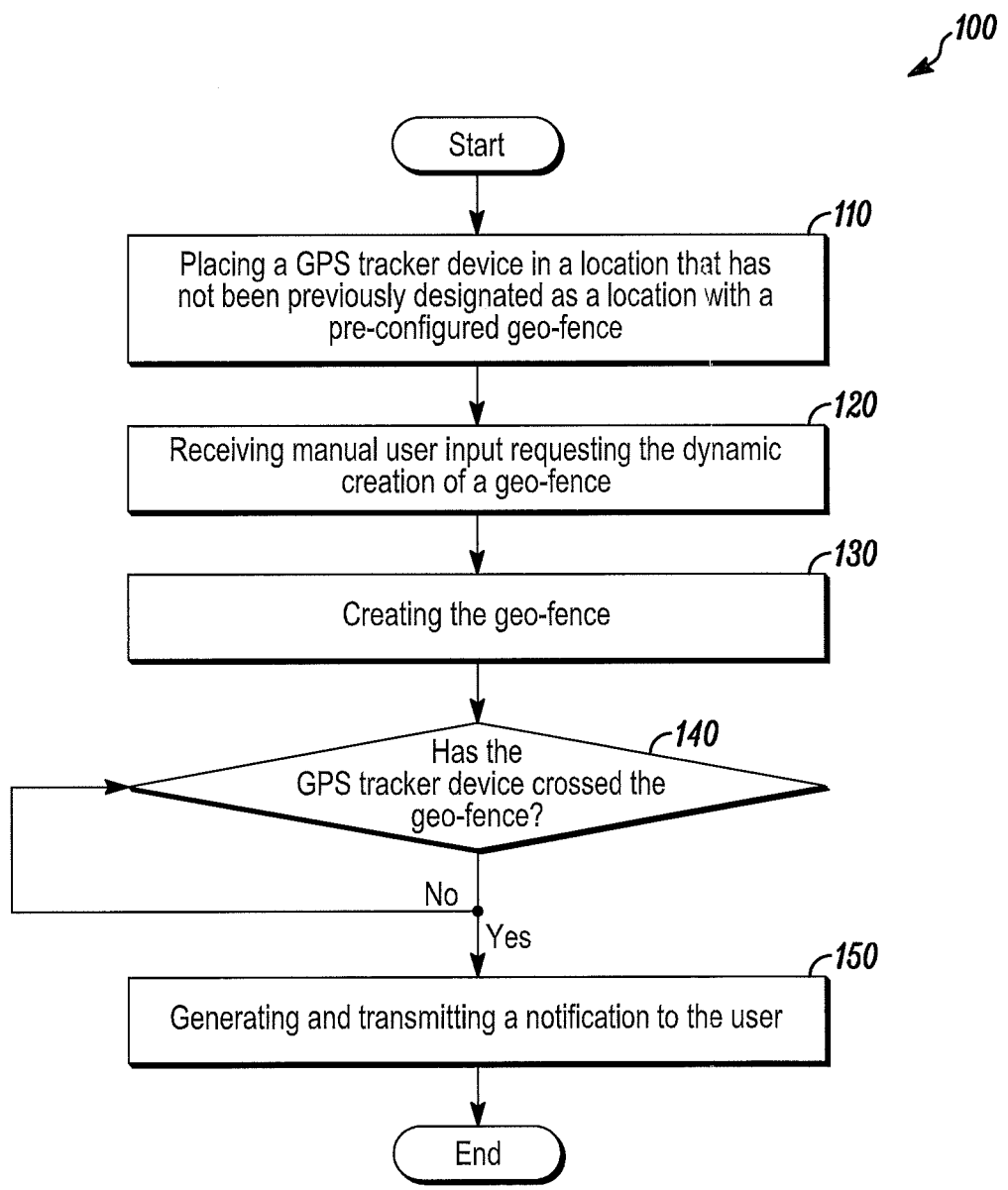
FIG. 1 is a flow diagram of a method of receiving manual user input to dynamically create a geo-fence.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include improved systems and methods with automatic radius cross notification for a GPS tracker device. For example, in some embodiments, a geo-fence can be dynamically created. That is, some embodiments disclosed herein can allow and/or facilitate the dynamic creation of a radius around a specific location.

According to some embodiments, systems and methods can receive manual user input via an application user interface, such as mobile application or a website. The user input can request that a geo-fence be created with a predetermined radius around a current location of a GPS tracker device. Accordingly, a notification can be generated and transmitted when the GPS tracker device and/or an object associated with the GPS tracker device, such as the user's vehicle, crosses the newly created geo-fence.

According to some embodiments, systems and methods can receive manual user input via a user input device, for example, a physical button, connected to or associated with, either physically or wirelessly, for example, via Bluetooth® or other local wireless technology, the GPS tracker device. Activating or depressing the user input device, for example, the button, can request that the GPS tracker device create a geo-fence with a predetermined radius around a current location of the GPS tracker device. Accordingly, a notification can be generated and transmitted when the GPS tracker device and/or an object associated with the GPS tracker device, such as the user's vehicle, crosses the newly created geo-fence.

In embodiments in which systems and methods can receive manual user input to request the creation of a geo-fence, a user can stop or park his vehicle associated with a GPS tracker device at a location, for example, in the parking lot of a shopping mall. Then, the user can provide manual user input by logging in to a website or mobile application via the user's mobile device to gain access to the user's account and provide user input via the interface of the website or mobile application. Additionally or alternatively, the user can provide manual user input by activating or depressing a user input device, such as a physical button, connected to or associated with the GPS tracker device.

Regardless of the embodiment, the manual user input can provide an indication to systems and methods disclosed herein that a geo-fence should be dynamically created. Then, relevant data can be transmitted to the GPS tracker device to create the geo-fence and/or a server-side of systems and methods disclosed herein can process the relevant data to create the geo-fence.

According to some embodiments, systems and methods can automatically determine when the GPS tracker device has been stationary for a predetermined period of time. Then, when systems and methods determine that the GPS tracker has been stationary for the predetermined period of time, systems and methods can create a geo-fence with a predetermined radius around a current location of the GPS tracker device. Accordingly, a notification can be generated and transmitted when the GPS tracker device and/or an object associated with the GPS tracker device, such as a user's vehicle, crosses the newly created geo-fence.

In some embodiments, the ability or feature of systems and methods to automatically determine when the GPS tracker device has been stationary for a predetermined period of time, and, responsive thereto, to create a geofence, can be enabled or selected by a user. For example, in some embodiments, the user can enable or select this ability or feature at some time before systems and methods begin determining when the GPS tracker device has been stationary for the predetermined period of time. In some embodiments, when the user enables or selects this ability or feature, systems and methods can transmit relevant data to the GPS tracker device to enable the feature and/or process relevant data at a server-side of systems and methods disclosed herein to enable the feature.

In embodiments in which systems and methods can create a geo-fence based on an automatic determination of the GPS tracker device being stationary for a predetermined period of time, a user can stop or park his vehicle containing a GPS tracker device at a location, for example, in the parking lot of a shopping mall. Then, the user can exit his vehicle without taking any additional steps, and, after the predetermined period of time, systems and methods disclosed herein, for example, the GPS tracker device and/or a server-side of systems and methods disclosed herein, can automatically create a geo-fence.

After a geo-fence is created in accordance with systems and methods disclosed herein, systems and methods can determine when the GPS tracker device or an object associated with the GPS tracker device, for example, a vehicle, crosses the geo-fence. That is, systems and methods disclosed herein can determine when the vehicle associated with the GPS tracker device exits the area defined by the predetermined radius around the location of the GPS tracker device when the geo-fence was created. When systems and method determine that the GPS tracker device crosses the geo-fence, systems and methods disclosed herein can generate and transmit a notification message to the user informing him of the movement.

FIG. 1 is a flow diagram of a method 100 of receiving manual user input to dynamically create a geo-fence. As seen in FIG. 1, the method 100 can include placing a GPS tracker device in a location that has not been previously designated as a location with a pre-configured geo-fence as in 110. For example, the method 100 can include a user parking his vehicle, which is associated with the GPS tracker device, in the parking lot of a shopping mall.

Then, the method 100 can include receiving manual user input requesting the dynamic creation of a geo-fence as in 120. For example, the manual user input can include user input received by a website or a mobile application, for example, via the user's mobile device. The manual user input can also include user input received via a user input device, for example, a physical button, connected to or associated with, either physically or wirelessly, the GPS tracker device.

Figure 3:
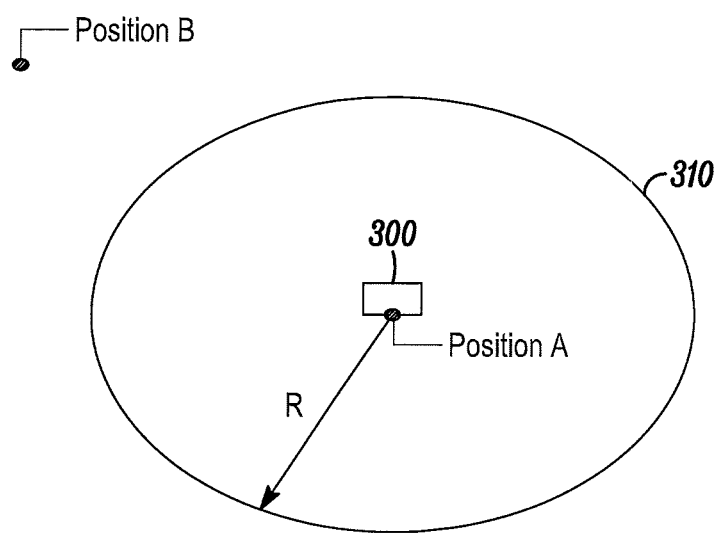
FIG. 3 is a block diagram of a dynamically created geo-fence in accordance with disclosed embodiments.

After the method 100 receives the manual user input requesting the dynamic creation of a geo-fence as in 120, the method 100 can include creating the geo-fence as in 130. For example, an exemplary geo-fence is shown in FIG. 3. The GPS tracker device 300 can be located at Position A, and the geo-fence 310 can be created at a predetermined radius R around Position A. In some embodiments, the manual user input received as in 120 can identify the distance of the radius R.

Once the geo-fence is created as in 130, the method 100 can include determining whether the GPS tracker device 300 has crossed the geo-fence 310 as in 140. If the method 100 determines that the GPS tracker device 300 has not crossed the geo-fence 310 as in 140, then the method 100 can continue determining whether the GPS tracker device 300 has crossed the geo-fence 310 as in 140 until the geo-fence 310 is no longer active.

However, if the method 100 determines that the GPS tracker device 300 has crossed the geo-fence 310 as in 140, then the method 100 can include generating and transmitting a notification message to a user as in 150. For example, the method 100 can determine that the GPS tracker device 300 has crossed the geo-fence 310 as in 140 when the GPS tracker device 300 is located in Position B or any other location outside of the geo-fence 310 in FIG. 3.

Figure 2:
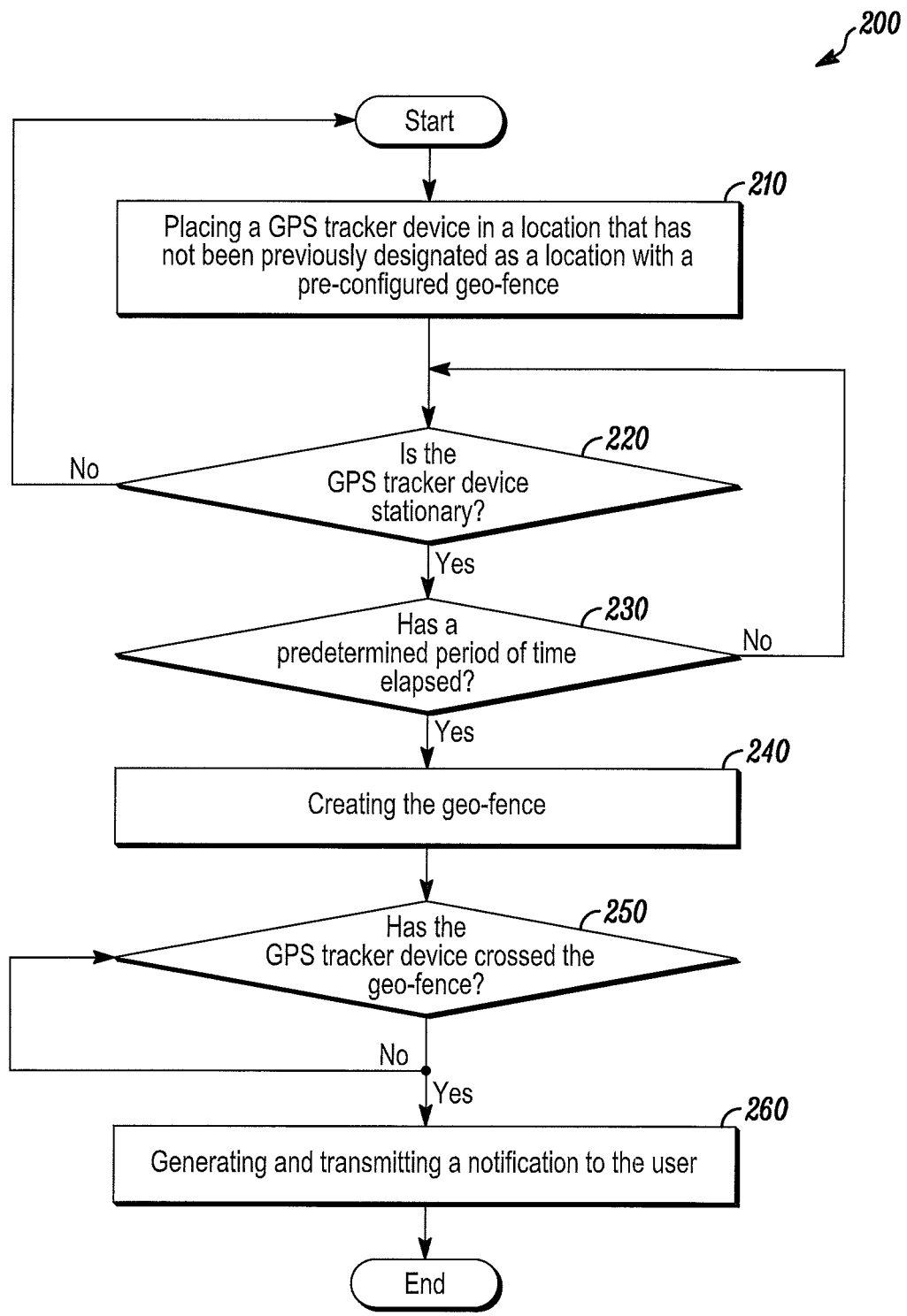
FIG. 2 is a flow diagram of a method of automatically determining when to dynamically create a geo-fence and of creating the geo-fence.

FIG. 2 is a flow diagram of a method 200 of automatically determining when to dynamically create a geo-fence and of creating the geo-fence. As seen in FIG. 2, the method 200 can include placing a GPS tracker device in a location that has not been previously designated as a location with a pre-configured geo-fence as in 210. For example, the method 200 can include a user parking his vehicle, which is associated with the GPS tracker device, in the parking lot of a shopping mall.

Then, the method 200 can include determining whether the GPS tracker device is stationary as in 220 and if so, determining whether a predetermined period of time has elapsed as in 230. When the predetermined period of time has elapsed while the GPS tracker device is stationary, the method 200 can include creating the geo-fence as in 240.

For example, an exemplary geo-fence is shown in FIG. 3. The GPS tracker device 300 can be located at Position A, and the geo-fence 310 can be created at a predetermined radius R around Position A. In some embodiments, a user can provide input to identify the distance of the radius R. For example, in some embodiments, the user can provide input to identify the distance of the radius R when providing input to enable the automatic determination of when to dynamically create a geo-fence.

Once the geo-fence is created as in 240, the method 200 can include determining whether the GPS tracker device 300 has crossed the geo-fence 310 as in 250. If the method 200 determines that the GPS tracker device 300 has not crossed the geo-fence 310 as in 250, then the method 200 can continue determining whether the GPS tracker device 300 has crossed the geo-fence 310 as in 250 until the geo-fence 310 is no longer active.

However, if the method 200 determines that the GPS tracker device 300 has crossed the geo-fence 310 as in 250, then the method 200 can generate and transmit a notification message to the user as in 260. For example, the method 200 can determine that the GPS tracker device 300 has crossed the geo-fence 310 as in 250 when the GPS tracker device 300 is located in Position B or any other location outside of the geo-fence 310 in FIG. 3.

Figure 4:
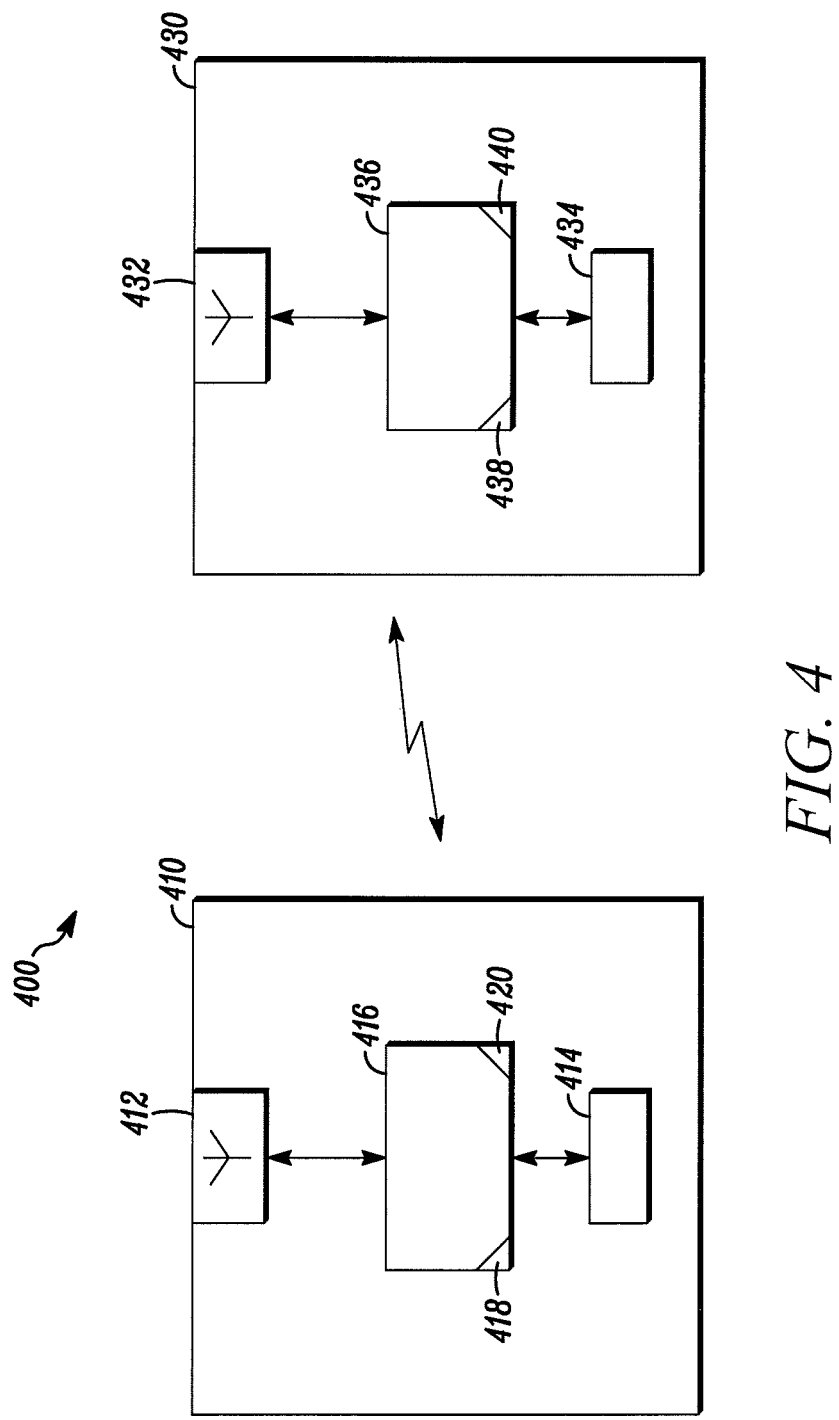
FIG. 4 is block diagram of a system for executing the methods of FIG. 1, FIG. 2, and others in accordance with disclosed embodiments.

FIG. 4 is block diagram of a system 400 for executing the methods of FIG. 1, FIG. 2, and others in accordance with disclosed embodiments. As seen in FIG. 4, the system 400 can include a GPS tracker device 410 in wireless communication with a remote computer or server 430.

For example, the GPS tracker device 410 can include a transceiver 412, a user interface device 414, control circuitry 416, one or more programmable processors 418, and executable control software 420 stored on a transitory or non-transitory computer readable medium, including but not limited to, computer memory, RAM, optical storage media, magnetic storage media, flash memory, and the like. Similarly, the remote computer or server 430 can include a transceiver 432, a user interface device 434, control circuitry 436, one or more programmable processors 438, and executable control software 440 stored on a transitory or non-transitory computer readable medium, including but not limited to, computer memory, RAM, optical storage media, magnetic storage media, flash memory, and the like.

In some embodiments, the executable control software 420 associated with the GPS tracker device 410 and/or the executable control software 440 associated with the remote computer or server 430 can implement some or all of the steps of methods 100 and 200 shown in FIG. 1 and FIG. 2, respectively, as all as others disclosed herein.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method comprising:
    a tracker device receiving first user input requesting a dynamic creation of a first geo-fence;
    the tracker device receiving second user input identifying a distance of a radius of the first geo-fence after receiving the first user input requesting the dynamic creation of the geo-fence;
    responsive to the received first and second user inputs, the tracker device creating the first geo-fence having the radius around an object associated with the tracker device;
    the object crossing the created first geo-fence;
    the tracker device automatically creating a second geo-fence around the object at another location without any additional steps by a user; and
    the tracker device tracking the object around a location that is not necessarily predetermined or frequently visited,
    wherein the automatic creating of the second geo-fence around the object at the another location and the tracking of the object around the location that is not necessarily predetermined or frequently visited are selectable features activated by a physical button associated with the tracker device, and
    wherein a notification is sent to the user each time the object crosses the created first or second geo-fence.

2. The method of claim 1 wherein receiving the first user input requesting the dynamic creation of the first geo-fence includes receiving the first user input via an application user interface or receiving the first user input via a user input device.

3. The method of claim 1 further comprising identifying a current location of the tracker device.

4. The method of claim 3 wherein creating the second geo-fence includes identifying a boundary defined by a predetermined radius from the current location of the tracker device.

5. The method of claim 1 further comprising determining when the tracker device crosses the first or second geo-fence.

6. A method comprising:
    determining when a GPS tracker device has been stationary for a predetermined period of time;
    the GPS tracker device receiving user input identifying a distance of a radius of a first geo-fence after determining that the GPS tracker device has been stationary for the predetermined period of time;
    responsive to determining when the GPS tracker device has been stationary for the predetermined period of time, dynamically creating the first geo-fence having the radius at a first location around an object associated with the GPS tracker device;
    the object crossing the created first geo-fence;
    the GPS tracker device automatically creating a second geo-fence at a second location without any additional input from a user; and
    the GPS tracker device tracking the object around a location that is not necessarily predetermined or frequently visited,
    wherein creating the second geo-fence around the object at the second location and tracking the object around the location that is not necessarily predetermined or frequently visited are selectable features activated by a physical button associated with the GPS tracker device, and
    wherein a notification is sent to the user each time the object crosses the created first or second geo-fence.

7. The method of claim 6 further comprising enabling a capability to determine when the GPS tracker device has been stationary for the predetermined period of time and responsive thereto, to dynamically create the first geo-fence.

8. The method of claim 6 further comprising identifying a current location of the GPS tracker device.

9. The method of claim 6 further comprising determining when the GPS tracker device crosses the geo-fence.

10. The method of claim 9 further comprising transmitting the notification when the GPS tracker device crosses the first or second geo-fence.

11. A system comprising:
    a GPS tracker device; and
    a remote server in wireless communication with the GPS tracker device,
    wherein, responsive to a predetermined condition, at least one of the GPS tracker device and the remote server dynamically creates a first geo-fence around an object associated with the GPS tracker device, determines that the first geo-fence has been crossed, and automatically creates a second geo-fence at another location without any additional steps by a user,
    wherein the GPS tracker device tracks the object around a location that is not necessarily predeteimined or frequently visited,
    wherein the creating of the second geo-fence around the object at the another location and the tracking of the object around the location that is not necessarily predetermined or frequently visited are selectable features activated by a physical button associated with the GPS tracker device,
    wherein a notification is sent to the user each time the object crosses the created first or second geo-fence,
    wherein the predetermined condition includes at least one of the GPS tracker device or the remote server receiving first user input requesting dynamic creation of the first geo-fence around the GPS tracker device, and
    wherein the first user input requesting dynamic creation of the first geo-fence further includes second user input identifying a distance of a radius of the first geo-fence.

12. The system of claim 11 wherein the remote server receiving the first user input requesting dynamic creation of the first geo-fence around the GPS tracker device includes the remote server receiving the first user input via an application user interface.

13. The system of claim 11 wherein the predetermined condition includes a predetermined period of time elapsing during which the GPS tracker device is stationary.

14. The system of claim 11 further comprising at least one of the GPS tracker device and the remote server transmitting the notification when the GPS tracker device crosses the first or second geo-fence.

* * * * *